(12) United States Patent
Hoshi

(10) Patent No.: US 7,595,936 B2
(45) Date of Patent: Sep. 29, 2009

(54) ZOOM LENS SYSTEM AND CAMERA HAVING THE SAME

(75) Inventor: Koji Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 12/108,734

(22) Filed: Apr. 24, 2008

(65) Prior Publication Data

US 2008/0266673 A1  Oct. 30, 2008

(30) Foreign Application Priority Data

Apr. 25, 2007 (JP) ............................. 2007-115085

(51) Int. Cl.
*G02B 15/14* (2006.01)
(52) U.S. Cl. ..................................... 359/687
(58) Field of Classification Search ................. 359/687
See application file for complete search history.

(56) References Cited

U.S. PATENT DOCUMENTS

| | | | |
|---|---|---|---|
| 5,638,216 A | 6/1997 | Horiuchi et al. | |
| 6,178,049 B1 | 1/2001 | Mukaiya et al. | |
| 6,226,130 B1 | 5/2001 | Mukaiya et al. | |
| 6,606,194 B2 * | 8/2003 | Hamano et al. | ............. 359/557 |
| 2002/0024732 A1 | 2/2002 | Hamano et al. | |
| 2003/0189763 A1 | 10/2003 | Horiuchi | |
| 2005/0007480 A1 | 1/2005 | Hamano et al. | |
| 2005/0190458 A1 | 9/2005 | Hamano et al. | |
| 2005/0195482 A1 | 9/2005 | Yamada et al. | |
| 2005/0270646 A1 | 12/2005 | Yamada et al. | |

FOREIGN PATENT DOCUMENTS

| | | |
|---|---|---|
| JP | 05-060971 A | 3/1993 |
| JP | 07-128619 A | 5/1995 |
| JP | 08-304700 A | 11/1996 |
| JP | 09-281390 A | 10/1997 |
| JP | 09-304698 A | 11/1997 |
| JP | 11-237550 A | 8/1999 |
| JP | 11-344669 A | 12/1999 |
| JP | 2000-121941 A | 4/2000 |
| JP | 2002-244037 A | 8/2002 |
| JP | 2003-295053 A | 10/2003 |
| JP | 2003-322795 A | 11/2003 |
| JP | 2005-242014 A | 9/2005 |
| JP | 2006-227644 A | 8/2006 |

\* cited by examiner

*Primary Examiner*—William C Choi
(74) *Attorney, Agent, or Firm*—Canon USA Inc IP Div

(57) ABSTRACT

A zoom lens system, in that order from an object side to an image side, includes first to fourth lens units respectively having positive, negative, positive, and positive optical powers. The second and fourth lens units move along an optical axis during zooming. In the zoom lens system, the third lens unit includes a first lens subunit having a negative optical power, and a second lens subunit having a positive optical power, in that order from the object side to the image side. The first lens subunit has no more than a positive lens element and a negative lens element. The second lens subunit has no more than a positive lens element and a negative lens element. Accordingly, the arrangements of the third lens unit and other lens units are properly set.

12 Claims, 9 Drawing Sheets

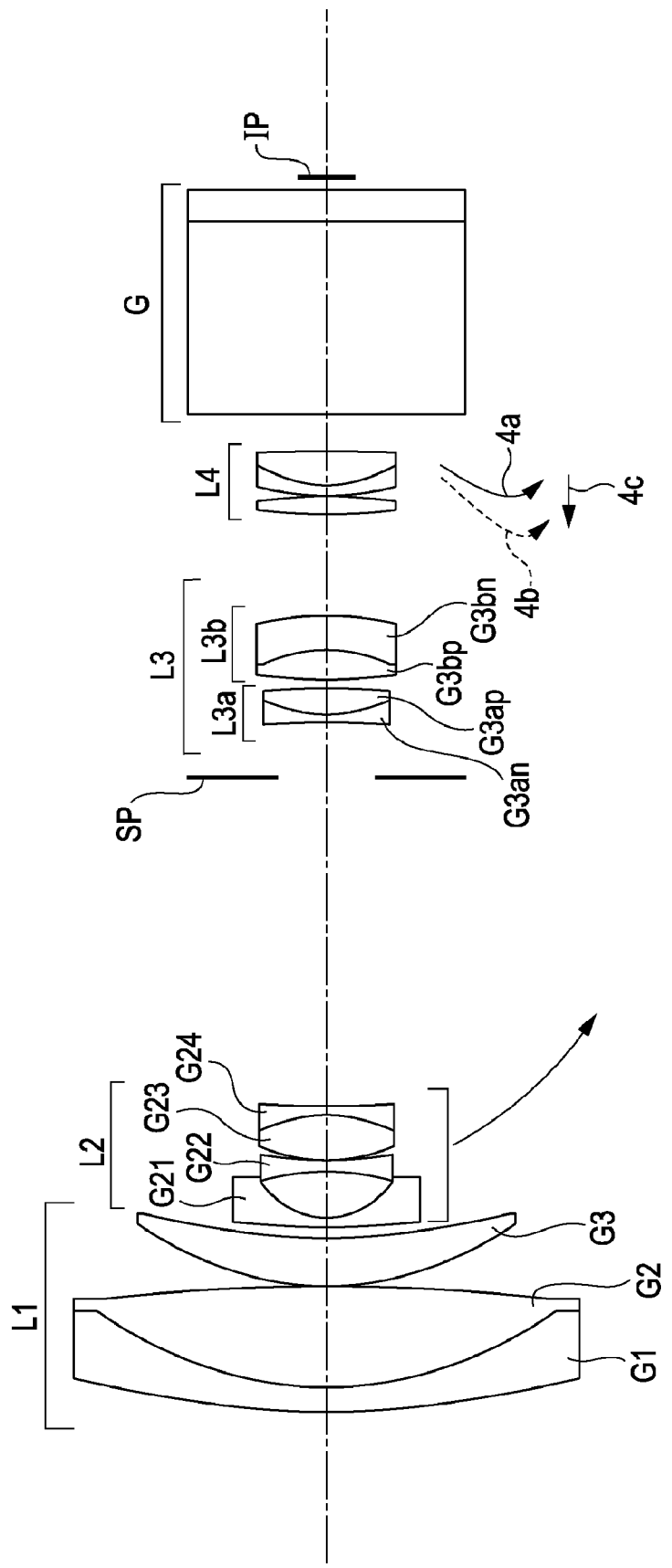

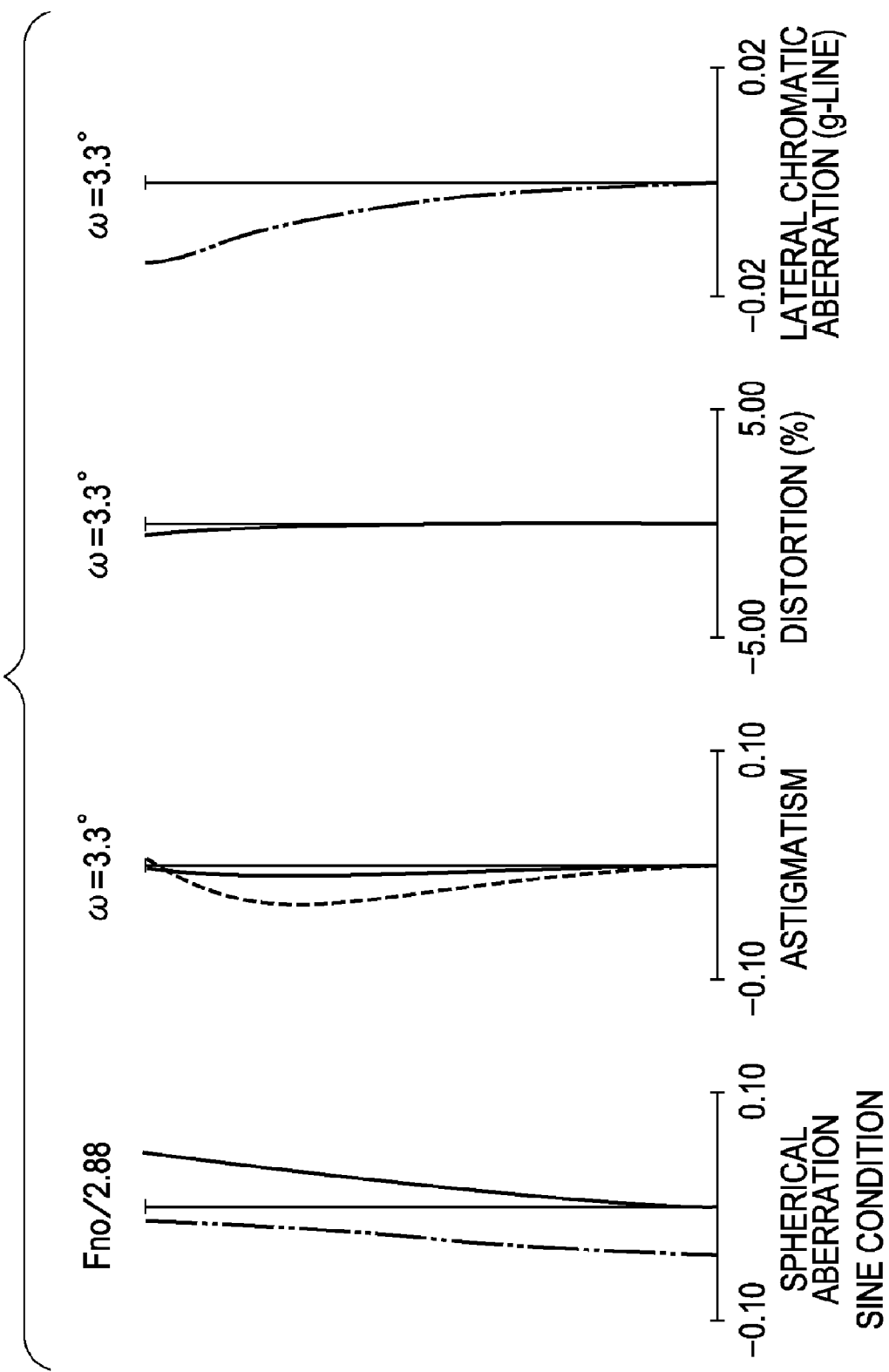

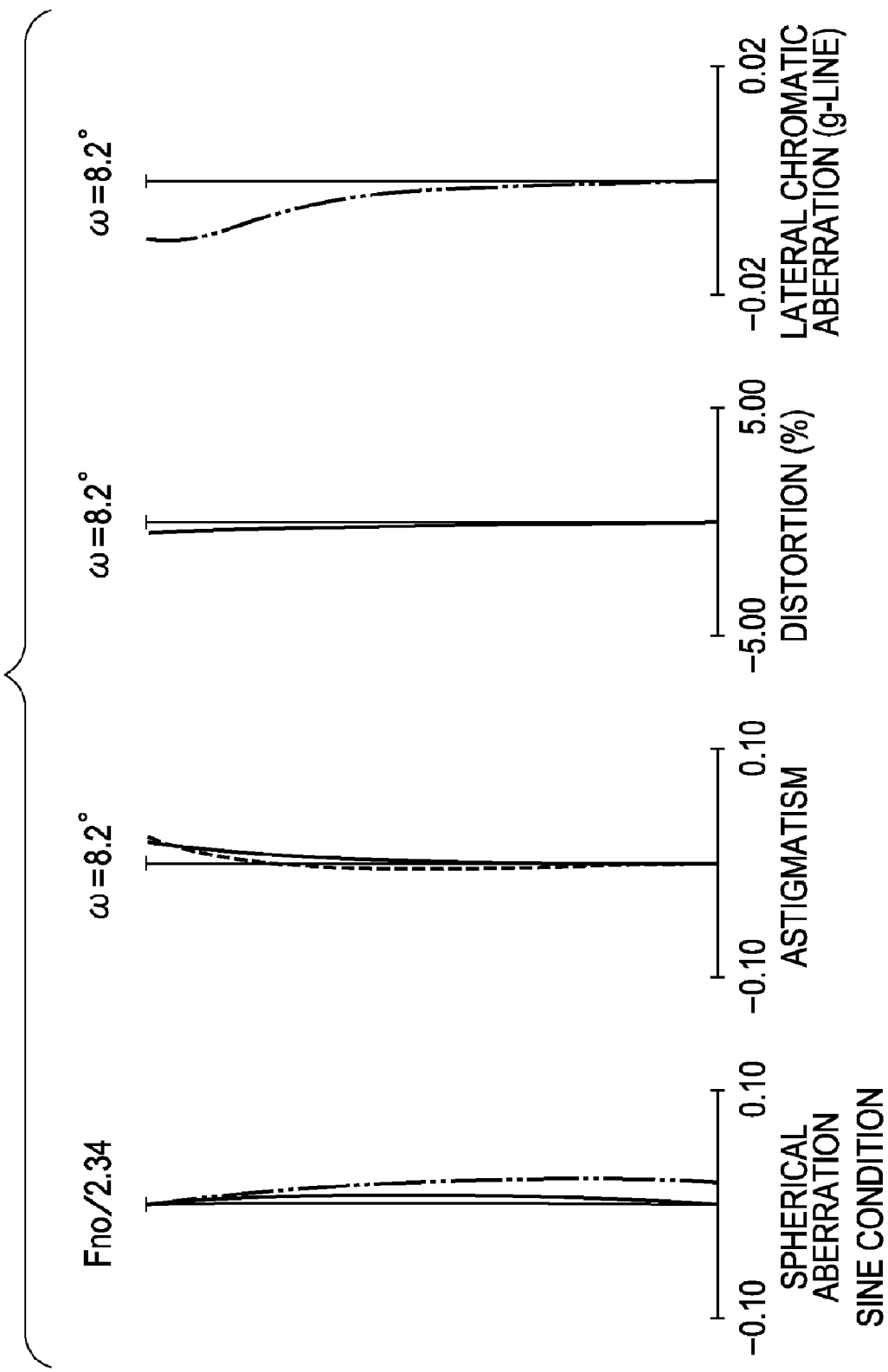

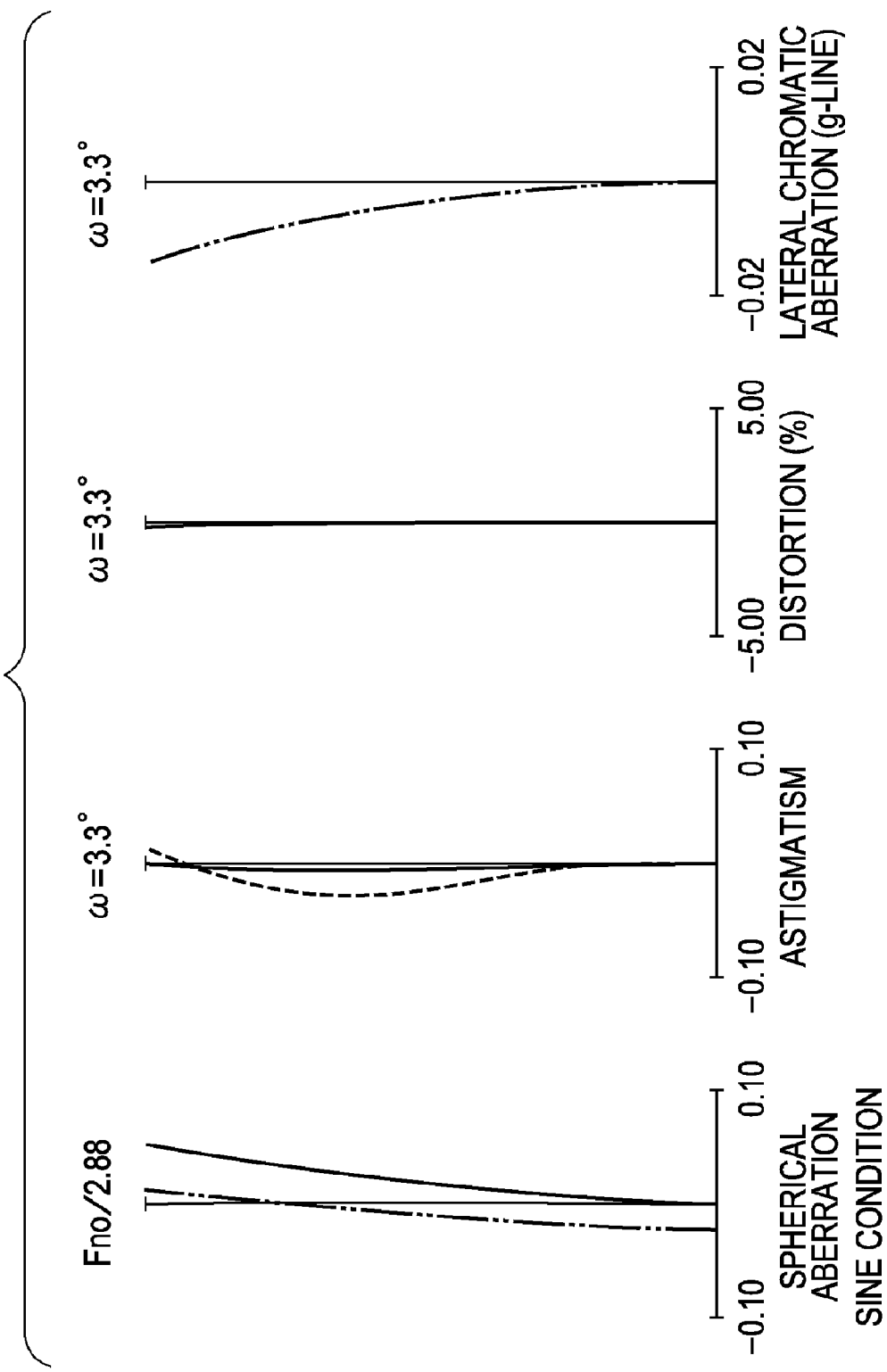

ZOOM LENS SYSTEM AND CAMERA HAVING THE SAME

BACKGROUND OF THE INVENTION

1. Field of the Invention

The present invention relates to zoom lens systems.

2. Description of the Related Art

A zoom lens having a high zoom ratio and a high optical performance in a whole zooming region is being demanded for a photographing optical system in an image pickup apparatus, such as a video camera or a digital still camera using a solid-state image pickup element, or a silver-halide type camera using a silver-halide film.

A zoom lens meeting the demand may be a four unit zoom lens including four lens units of a first lens unit having a positive refractive power, a second lens unit having a negative refractive power, a third lens unit having a positive refractive power, and a fourth lens unit having a positive refractive power, in that order from an object side to an image side.

In the four unit zoom lens, the second lens unit moves for magnification variation, and the fourth lens unit compensates an image plane variation caused by the magnification variation and performs focusing. (For example, see (1) Japanese Patent Laid-Open No. 08-304700, (2) Japanese Patent Laid-Open No. 2000-121941, (3) Japanese Patent Laid-Open No. 2003-295053, which corresponds to U.S. Patent Application Publication No. 2003/0189763, (4) Japanese Patent Laid-Open No. 05-060971, which corresponds to U.S. Pat. No. 5,638,216, (5) Japanese Patent Laid-Open No. 2005-242014, which corresponds to U.S. Patent Application Publication No. 2005/0007480 and No. 2005/0190458, (6) Japanese Patent Laid-Open No. 07-128619, (7) Japanese Patent Laid-Open No. 11-237550, which corresponds to U.S. Patent Application Publication No. 2002/0024732 and No. 2002/0063961, (8) Japanese Patent Laid-Open No. 11-344669, which corresponds to U.S. Patent Application Publication No. 2005/0195482 and No. 2005/0270646, (9) Japanese Patent Laid-Open No. 2002-244037, and (10) Japanese Patent Laid-Open No. 2003-322795.)

In a typical zoom lens, if the refractive power of each lens unit is increased, a moving distance of each lens for obtaining a certain zoom ratio unit is decreased. Thus, the total lens length can be decreased while the certain zoom ratio can be provided, thereby easily downsizing the entire system.

However, merely increasing the refractive power of each lens unit to decrease the moving distance of each lens unit may increase an aberration variation during zooming. It is difficult to obtain a high optical performance in the whole zooming region.

Particularly in a rear focus four unit zoom lens, it is important to properly set the lens arrangements of the first and third lens units provided on the object side and the image side of the second lens unit for magnification variation, so as to obtain a high optical performance in a whole screen.

SUMMARY OF THE INVENTION

The present invention provides a zoom lens system capable of obtaining a high optical performance in a whole zooming region.

A zoom lens system according to an aspect of the invention, in that order from an object side to an image side, includes a first lens unit having a positive optical power, a second lens unit having a negative optical power, a third lens unit having a positive optical power, and a fourth lens unit having a positive optical power. In the zoom lens system, the second and fourth lens units move along an optical axis during zooming.

In the zoom lens system, the third lens unit includes a first lens subunit having a negative optical power, and a second lens subunit having a positive optical power, in that order from the object side to the image side. The first lens subunit has no more than a positive lens element and a negative lens element. The second lens subunit has no more than a positive lens element and a negative lens element.

With this arrangement, the arrangements of the third lens unit and other lens units are properly set.

Further features of the present invention will become apparent from the following description of exemplary embodiments with reference to the attached drawings.

BRIEF DESCRIPTION OF THE DRAWINGS

FIG. 1 is a lens cross section of a zoom lens according to a first embodiment.

FIGS. 2A to 2C are aberration diagrams of the zoom lens according to the first embodiment.

FIGS. 4A to 4C are aberration diagrams of the zoom lens according to the second embodiment.

DESCRIPTION OF THE EMBODIMENTS

Figure 2A:
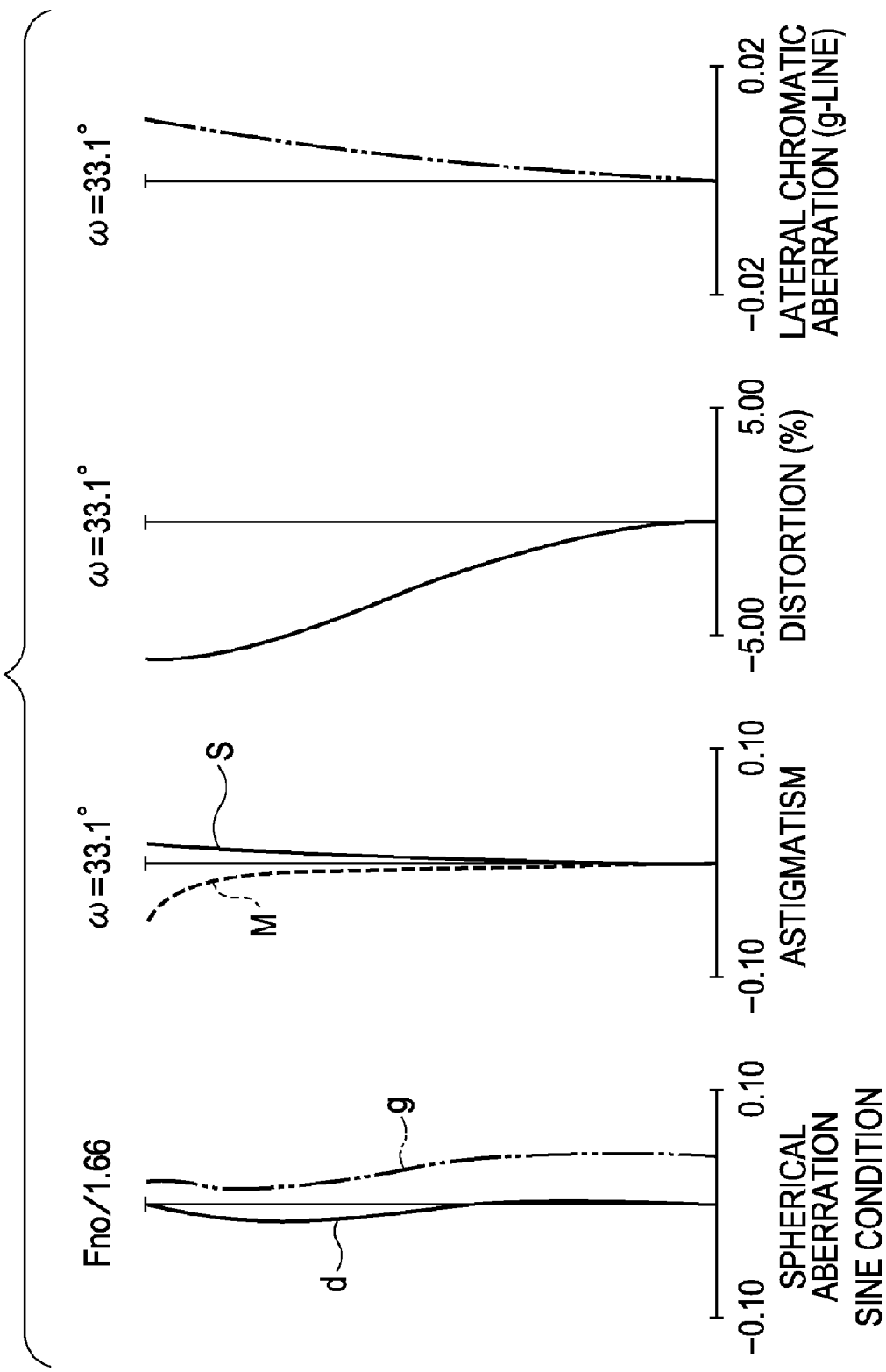

Embodiments of a zoom lens system and a camera having the zoom lens system are described below with reference to the drawings. First, a major configuration of the zoom lens system according to an embodiment of the invention is described.

The zoom lens system according to the embodiment of the invention includes first, second, third, and fourth lens units having positive, negative, positive, and positive refractive powers (optical power=reciprocal of focal length), in that order from an object side to an image side. The third lens unit includes a first lens subunit having a negative refractive power, and a second lens subunit having a positive refractive power, in that order from the object side to the image side. The second and fourth lens units move along an optical axis during zooming. Herein, when the lens units "move along the optical axis", the lens units may move only in the optical axis direction, or in a direction oblique to the optical axis. The first lens subunit has no more than a negative lens element and a positive lens element. The second lens subunit has no more than a positive lens element and a negative lens element.

Assuming that the four unit zoom lens has the above-described configuration, a zoom lens system according to an aspect of the invention satisfies the following conditional expression:

$$0.21 < 3aNn - 3bPn \quad (1)$$

$$0.07 < 4Pn - 3bPn \quad (2)$$

where $3aNn$ is a refractive index of a material of the negative lens element in the first lens subunit, $3bPn$ is a refractive index of a material of the positive lens element in the second lens subunit, and $4Pn$ is a refractive index of a material having the highest refractive index in a material of a positive lens element included in the fourth lens unit.

In a zoom lens system according to another aspect of the invention, in addition to the above-described assumption of the four unit zoom lens, it is assumed that the first lens unit has no more than three lens elements of a negative lens element, a positive lens element, and a positive lens element, in that order from the object side to the image side. Also, the following conditional expressions are satisfied:

$$0.21 < 3aNn - 3bPn \quad (1)$$

$$0.01 < G1n - G3n < 0.11 \quad (3)$$

where 3aNn is a refractive index of a material of the negative lens element in the first lens subunit, 3bPn is a refractive index of a material of the positive lens element in the second lens subunit, G1n is a refractive index of a material of the negative lens element in the first lens unit, and G3n is a refractive index of a material of the positive lens element near the image side in the first lens unit.

A zoom lens system according to still another aspect of the invention, in addition to the above-described assumption of the four unit zoom lens, satisfies the following conditional expression:

$$0.21 < 3aNn - 3bPn \quad (1)$$

$$-1.0 < 3aR2/3aR1 < 0.1 \quad (4)$$

where 3aNn is a refractive index of a material of the negative lens element in the first lens subunit, 3bPn is a refractive index of a material of the positive lens element in the second lens subunit, 3aR1 is a radius of curvature of a lens surface near the object side of the negative lens element in the first lens subunit, and 3aR2 is a radius of curvature of a lens surface near the image side of the negative lens element in the first lens subunit.

Next, the technical meaning of each of the above conditional expressions is described below.

Conditional Expression (1) relates to a difference between the refractive index of the material of the negative lens element in the first lens subunit, and the refractive index of the material of the positive lens element in the second lens subunit.

The value may be below the lower limit of Conditional Expression (1) if the refractive index of the material of the negative lens element in the first lens subunit is decreased, or if the refractive index of the material of the positive lens element in the second lens subunit is increased. In this case, a curvature of field may be excessive (over compensation). Satisfying Conditional Expression (1) can provide a proper curvature of field.

To make the curvature of field more flat, the lower limit of Conditional Expression (1) may be 0.25. In particular, the lower limit may be 0.29. If the refractive index of the material of the negative lens element in the first lens subunit is too high, it is difficult to process the material. Thus, the upper limit of Conditional Expression (1) may be 0.51.

Conditional Expression (2) relates to a difference between the refractive index of the material of the positive lens element in the second lens subunit, and the refractive index of the material having the highest refractive index in the material of the positive lens element included in the fourth lens unit.

The value may be below the lower limit if the refractive index of the material of the positive lens element in the fourth lens unit is decreased, or if the refractive index of the positive lens element in the second lens subunit is increased. In this case, a curvature of field may be insufficient (under compensation). Satisfying Conditional Expression (2) can provide a proper curvature of field.

To make the curvature of field more flat, the lower limit of Conditional Expression (2) may be 0.11. If the refractive index of the material of the positive lens element in the fourth lens subunit is too high, it is difficult to select a low-dispersion material. Thus, it is difficult to compensate transverse chromatic aberration at a wide angle end. To avoid this, the upper limit of Conditional Expression (2) may be 0.19.

Conditional Expression (3) relates to a difference between the refractive index of the material of the negative lens element in the first lens unit, and the refractive index of the material of the positive lens element near the image side in the first lens unit. If the value is below the lower limit of Conditional Expression (3), when the curvature of field is made more flat at a telephoto end, the curvature of field may be excessive in a range from an intermediate zooming position to the telephoto end.

In contrast, if the value is above the upper limit of Conditional Expression (3), the refractive index of the material of the positive lens element near the image side is too low. Thus, it is difficult to compensate spherical aberration at the telephoto end.

Further, it is desired to set the numerical range of Conditional Expression (3) as follows:

$$0.02 < G1n - G3n < 0.08 \quad (3a)$$

Conditional Expression (4) relates to a lens shape (radius of curvature) of the negative lens element in the first lens subunit. If the value is below the lower limit of Conditional Expression (4), the radius of curvature at a concave surface near the object side is decreased. In this case, to prevent the first lens subunit from mechanically interfering with an aperture stop which is usually located on the object side of the first lens subunit, a distance between the aperture stop and the first lens subunit is increased. Then, a distance between the aperture stop and the second lens subunit is also increased, resulting in that a lens diameter of the second lens subunit is increased. Accordingly, a driving device to drive the second lens subunit for image stabilization needs a high power, and the driving device is disadvantageously increased in size.

The lower limit of Conditional Expression (4) may be −0.50. In particular, the lower limit may be −0.25.

In contrast, if the value is above the upper limit of Conditional Expression (4), the negative refractive power at a lens surface near the object side in the first lens subunit is decreased, or the positive refractive power thereof is increased. It is difficult to provide a long back focus.

In particular, the upper limit of Conditional Expression (4) may be −0.01.

The zoom lens system according to the embodiment of the invention is suitable to a zoom lens in which a third lens unit is divided into a lens subunit having a negative refractive power and a lens subunit having a positive refractive power, the lens subunit having the positive refractive power is moved in a direction with a component perpendicular to an optical axis, so as to obtain a still image (to stabilize an image). In such a zoom lens, it is important to properly set the arrangement of the third lens unit, so as to keep a high optical performance during image stabilization. By properly setting the arrangement of the third lens unit as described above, an amount of decentration aberration during image stabilization can be reduced, and the optical performance in the whole screen can be improved.

Next, detailed embodiments of the zoom lens system are described.

Figure 2B:
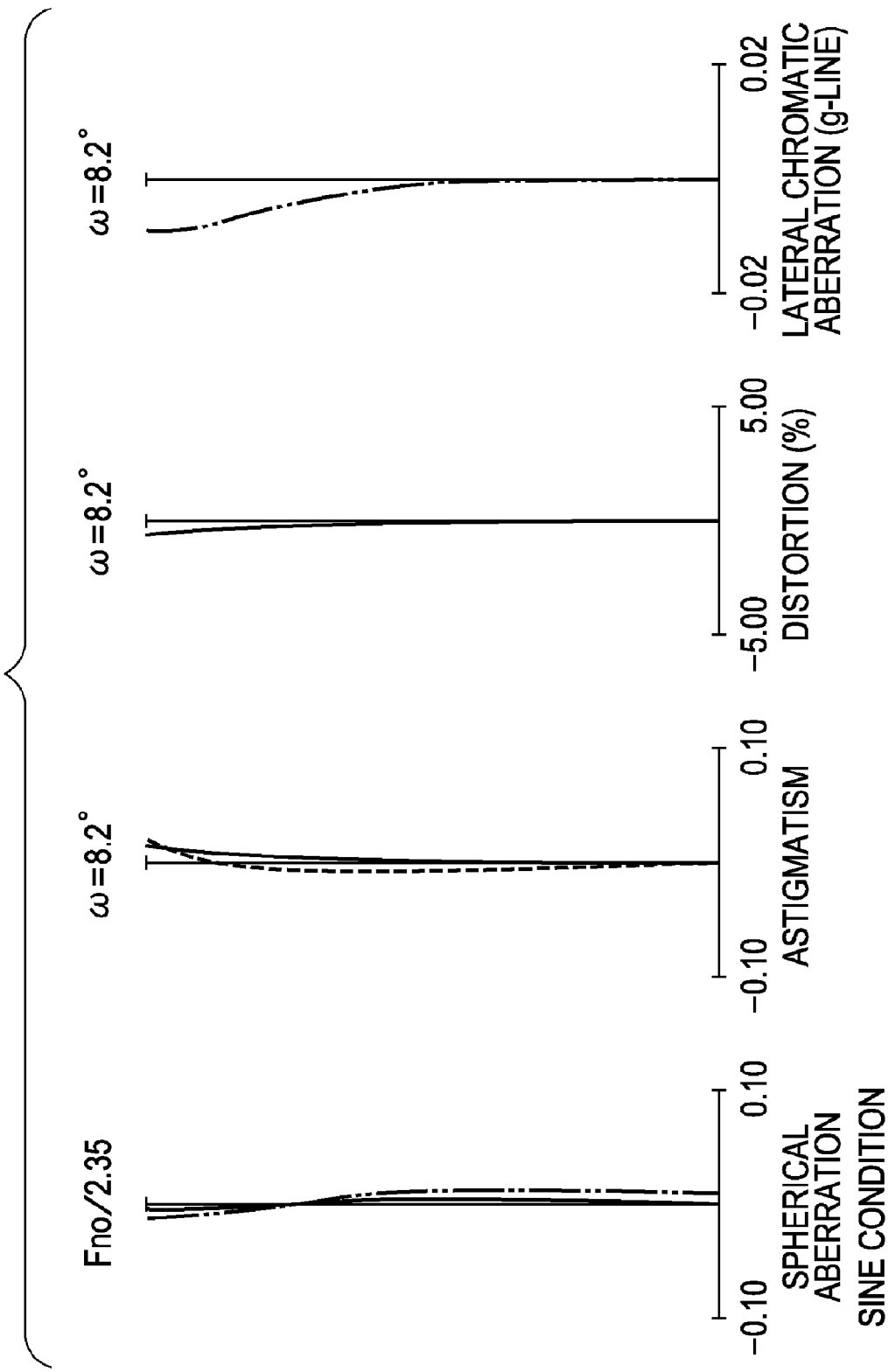

FIG. 1 is a lens cross section of a zoom lens at a wide angle end according to a first embodiment. FIGS. 2A, 2B, and 2C are aberration diagrams respectively at a wide angle end (short focal length end), an intermediate zooming position, and a telephoto end (long focal length end), of the zoom lens according to the first embodiment when the zoom lens is focused at an object at infinity.

Figure 3:
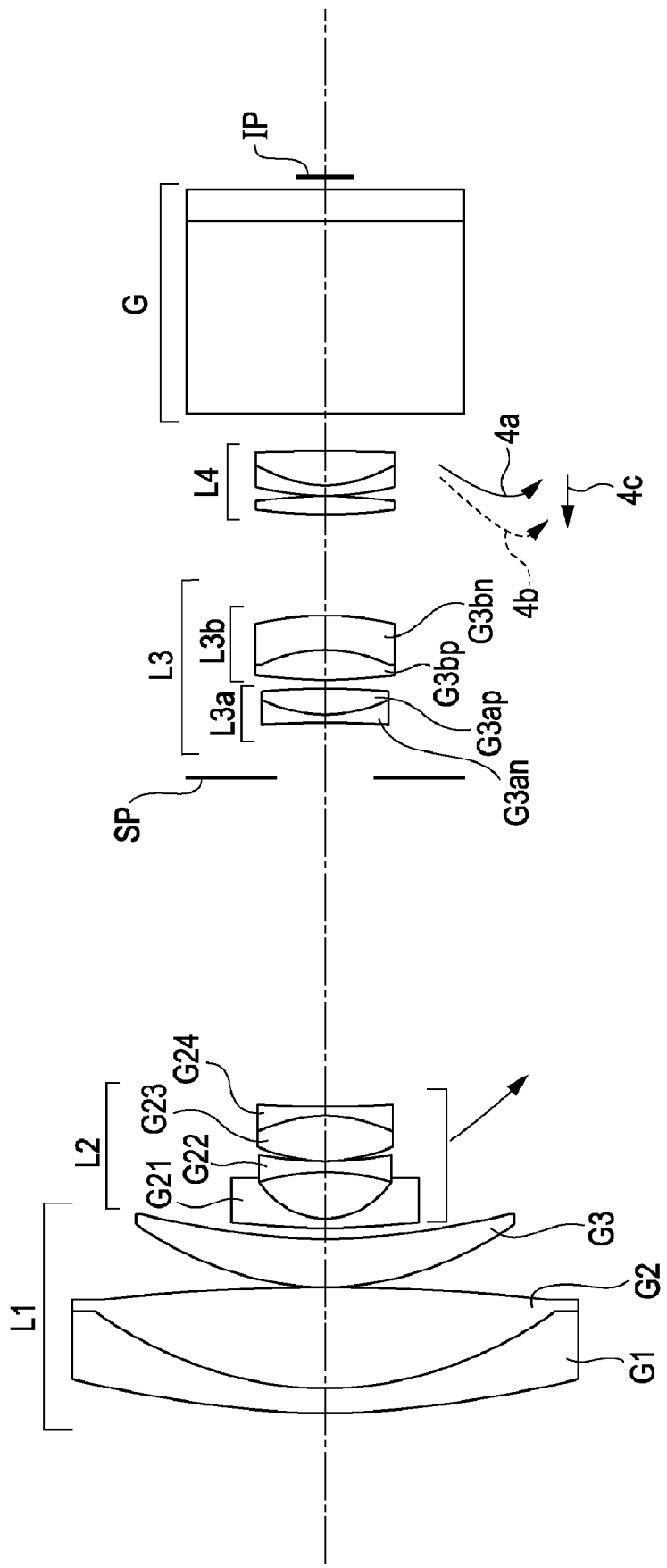
FIG. 3 is a lens cross section of a zoom lens according to a second embodiment.
Figure 4A:
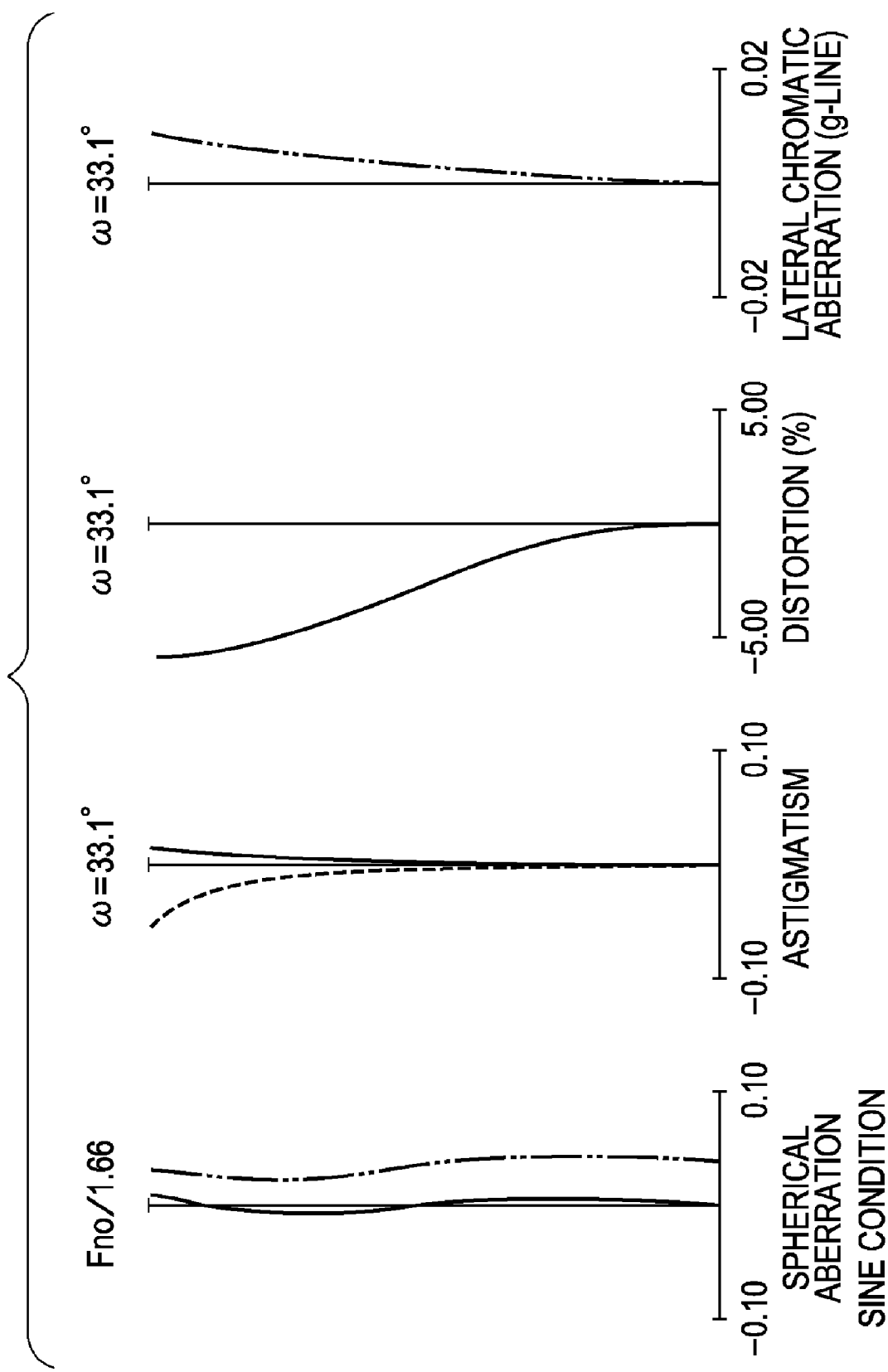

FIG. 3 is a lens cross section of a zoom lens at a wide angle end according to a second embodiment. FIGS. 4A, 4B, and 4C are aberration diagrams respectively at a wide angle end, an intermediate zooming position, and a telephoto end, of the zoom lens according to the second embodiment when the zoom lens is focused at an object at infinity.

Figure 5:
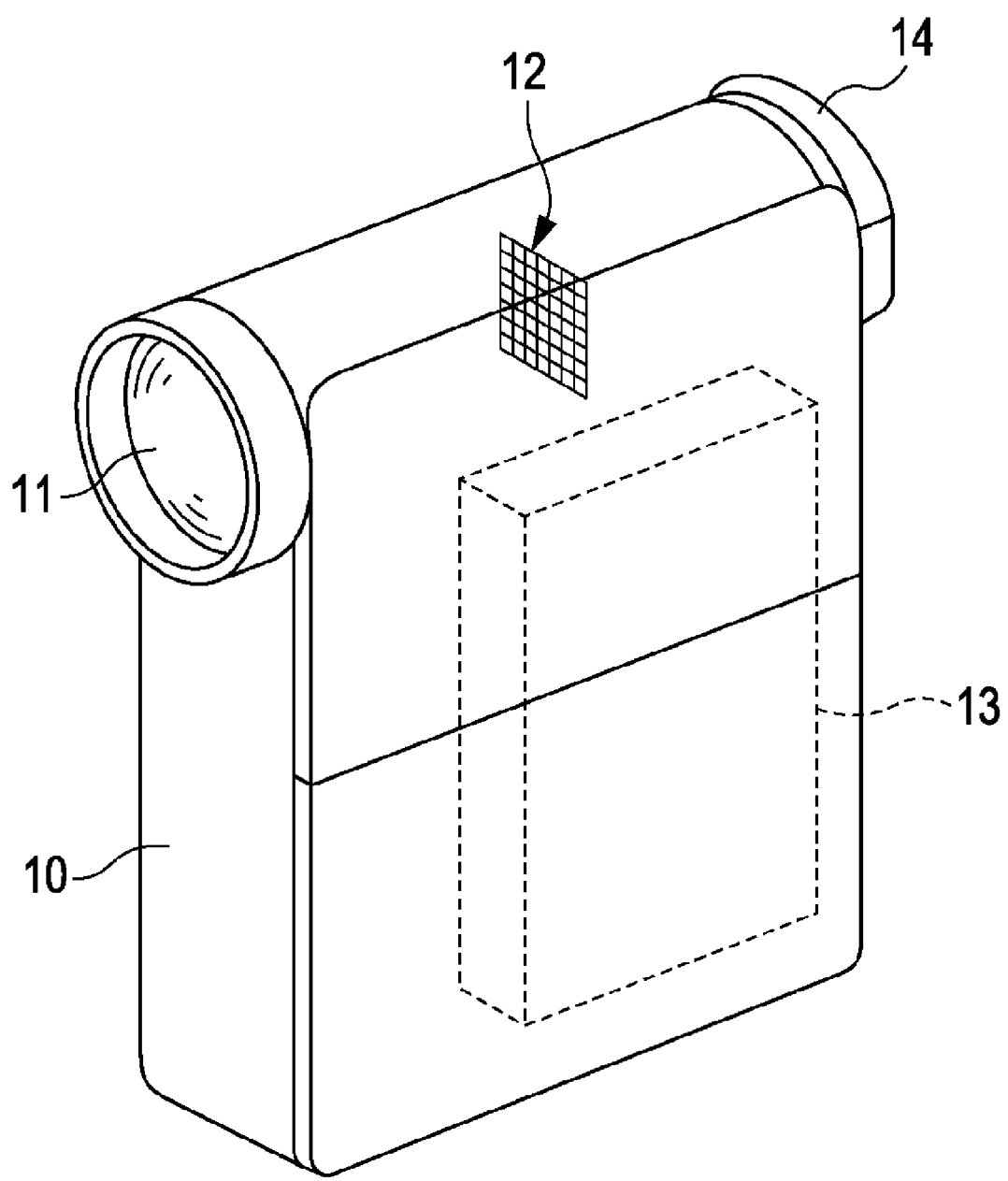
FIG. 5 is a schematic illustration showing a primary portion of an image pickup apparatus.

FIG. 5 is a schematic illustration showing a primary portion of a video camera (image pickup apparatus) having the zoom lens system of the embodiment of the invention.

In the lens cross sections of the zoom lens in FIGS. 1 and 3, reference character L1 denotes a first lens unit having a positive refractive power, L2 denotes a second lens unit having a negative refractive power, L3 denotes a third lens unit having a positive refractive power, and L4 denotes a fourth lens unit having a positive refractive power.

The third lens unit L3 includes a first lens subunit L3a having a negative refractive power, and a second lens subunit L3b having a positive refractive power. The second lens subunit L3b moves in a direction with a component perpendicular to an optical axis for image stabilization (for adjusting a shift of an image).

G denotes an optical block, which serves as, for example, an optical filter or a face plate. IP denotes an image plane. When the zoom lens of each embodiment is used as a photographing optical system of a video camera or a digital camera, the image plane IP serves as an image pickup surface of a solid-state image pickup element (photoelectric conversion element), such as a charge-coupled device (CCD) sensor or a complementary mental-oxide semiconductor (CMOS) sensor. When the zoom lens is used as a photographing optical system for a silver-halide film camera, the image plane IP serves as a film surface. SP denotes an aperture stop, which is provided on the object side of the first lens subunit L3a.

In the aberration diagrams, d denotes a d-line, g denotes a g-line, M denotes a meridional image plane, and S denotes a sagittal image plane. Transverse chromatic aberration is expressed by the g-line with reference to the d-line. Fno denotes an F-number, and ω denotes a half angle of view. The vertical axis of spherical aberration is expressed by the F-number. The vertical axis of each of astigmatism, distortion, and transverse chromatic aberration is expressed by the half angle of view.

In each embodiment described hereinafter, the wide angle end and the telephoto end represent zooming positions at both ends in a mechanically movable range of the lens unit for magnification variation (in each embodiment, the second lens unit L2) along the optical axis.

In each embodiment, the second lens unit L2 is moved along the optical axis toward the image side so as to vary magnification during zooming from the wide angle end toward the telephoto end. At this time, the fourth lens unit L4 is moved along a part of a locus protruding to the object side so as to compensate an image plane variation caused by the magnification variation.

Also, the fourth lens unit L4 is moved in the optical axis direction for focusing (for adjusting the focus). That is, a rear focus system is employed. A solid curve 4a and a dotted curve 4b of the fourth lens unit L4 are moving loci for compensating the image plane variation caused by zooming from the wide angle end to the telephoto end when the fourth lens unit L4 is focused at the object at infinity and at the object at close range.

Since the fourth lens unit L4 has the locus protruding to the object side, the space between the third lens unit L3 and the fourth lens unit L4 can be efficiently used, and the total lens length can be efficiently decreased. It is noted that the first lens unit L1 and the third lens unit L3 are not moved for zooming and focusing.

In each embodiment, to perform focusing at the telephoto end from the object at infinity to the object at close range, the fourth lens unit L4 is advanced as indicated by an arrow 4c.

In each embodiment, the second lens subunit (image stabilizing lens unit) L3b is moved in the direction with the component perpendicular to the optical axis, so as to compensate image blurring generated when the entire optical system is vibrated.

By moving the second lens subunit L3b for image stabilization in the direction with the component perpendicular to the optical axis, that is, in a direction perpendicular to the optical axis, or in a direction oblique (inclined) to the optical axis, an image can be shifted in a plane, thereby stabilizing the image. Accordingly, the image can be stabilized without an optical member such as a Vari-Angle Prism, or a lens unit for image stabilization being added. This can prevent the entire optical system from being increased in size.

In each embodiment, the first lens unit L1 has no more than a negative lens element G1, a positive lens element G2, and a positive lens element G3, in that order from the object side to the image side.

The negative lens element G1 is a meniscus lens having a convex surface near the object side. The positive lens element G2 is a biconvex lens (both surfaces are not necessarily convex, but are desired to be convex). The positive lens element G3 is a meniscus lens having a convex surface near the object side.

The second lens unit L2 includes a negative meniscus lens element G21 having a concave surface near the image side, a negative biconcave lens element G22, positive biconvex lens element G23, and negative biconcave lens element G24, in that order from the object side to the image side. The second lens unit L2 has such a lens arrangement, and hence, it reduces an aberration variation during zooming.

The third lens unit L3 includes a first lens subunit L3a having a negative refractive power, and a second lens subunit L3b having a positive refractive power. This arrangement can provide a sufficient back focus.

The first lens subunit L3a has no more than a negative lens element and a positive lens element.

In particular, the first lens subunit L3a has an arrangement as follows in that order from the object side to the image side. The first lens subunit L3a has no more than a negative bispherical lens element G3an having a concave surface near the image side, and a positive bispherical lens element G3ap. The negative lens element G3an has a higher absolute value of a refractive power at a surface near the image side than an absolute value of a refractive power at a surface near the object side. The positive lens element G3ap has a higher absolute value of a refractive power at a surface near the object side than an absolute value of a refractive power at a surface near the image side.

The negative lens element G3an and the positive lens element G3ap are cemented.

Since the first lens subunit L3a has no more than the negative lens element G3an and the positive lens element G3ap, the axial chromatic aberration can be reduced. Also, since both lens elements are spherical lenses, the lens elements can be manufactured easily.

The second lens subunit L3b has no more than a positive lens element and a negative lens element.

In particular, the second lens subunit L3b has no more than a positive lens element G3bp and a negative lens element G3bn having aspherical lens surfaces, in that order from the object side to the image side.

Since the second lens subunit L3b has no more than the positive lens element G3bp and the negative lens element G3bn having the aspherical surfaces, when the second lens subunit L3b is moved in the direction with the component perpendicular to the optical axis so as to shift an image in the direction perpendicular to the optical axis, i.e., when the second lens subunit L3b stabilizes an image, the decentration aberration can be reduced, and the optical performance can be prevented from deteriorating.

The fourth lens unit L4 includes a positive biconvex lens element, a negative meniscus lens element having a concave surface near the image side, and a positive lens element having a convex surface near the object side.

With this arrangement, the aberration variation during focusing can be reduced.

In each embodiment, above-described Conditional Expressions (1) to (4) are satisfied. Accordingly, advantages corresponding to the conditional expressions can be provided. If the advantages corresponding to the conditional expressions do not have to be provided, the whole conditional expressions are not necessarily satisfied at the same time.

In each embodiment, a lens unit having a small refractive power may be added on the object side of the first lens unit L1, or on the image side of the fourth lens unit L4.

A teleconverter lens, a wideconverter lens, or the like may be arranged on the object side or the image side.

With each embodiment described above, by properly setting the refractive power arrangement of each lens unit, and the lens arrangement of each lens unit, the entire lens system can be decreased in size while a desired zoom ratio is obtained. Thus, the zoom lens having a high optical performance can be provided.

Numerical Examples 1 and 2 corresponding to the first and second embodiments are shown below. In each numerical example, i denotes an order of a surface counted from the object side, ri denotes a radius of curvature of an i-th order (i-th surface), di denotes a distance between the i-th surface and (i+1)-th surface, ni denotes a refractive index with reference to the d-line, and vi denotes an Abbe number with reference to the d-line.

In Numerical Examples 1 and 2, three surfaces located most closely to the image side are planes corresponding to an optical block. Assuming that x is a shift in the optical axis direction with respect to a surface vertex at a position with a height h from the optical axis, an aspherical shape is expressed as follows:

$$x = \frac{(1/R)h^2}{1 + \sqrt{\{1 - (1+k)(h/R)^2\}}} + Bh^4 + Ch^6 + Dh^8 + Eh^{10} + Fh^{12}$$

where R is a paraxial radius of curvature, k is a conic constant, and B, C, D, E, and F are aspherical coefficients.

"e-X" represents "$\times 10^{-X}$". f denotes a focal length, FNo denotes an F-number, and ω denotes a half angle of view.

The relationship between the above conditional expressions and the numerical examples is shown in Table 1.

NUMERICAL EXAMPLE 1

| f = 4.61~52.71 FNo = 1: 1.66~2.88 2ω = 66.1°~6.5° | | | |
|---|---|---|---|
| r1 = 111.280 | d1 = 2.70 | n1 = 1.84666 | v1 = 23.9 |
| r2 = 43.824 | d2 = 11.03 | n2 = 1.60311 | v2 = 60.6 |
| r3 = −211.844 | d3 = 0.20 | | |
| r4 = 36.325 | d4 = 5.25 | n3 = 1.80400 | v3 = 46.6 |
| r5 = 86.842 | d5 = variable | | |
| r6 = 89.123 | d6 = 1.10 | n4 = 1.83481 | v4 = 42.7 |
| r7 = 8.506 | d7 = 5.07 | | |
| r8 = −23.776 | d8 = 1.10 | n5 = 1.80400 | v5 = 46.6 |
| r9 = 43.956 | d9 = 0.19 | | |
| r10 = 20.914 | d10 = 4.83 | n6 = 1.76182 | v6 = 26.5 |
| r11 = −16.769 | d11 = 0.90 | n7 = 1.60311 | v7 = 60.6 |
| r12 = 104.214 | d12 = variable | | |
| r13 = ∞ (aperture stop) | d13 = 6.23 | | |
| r14 = −91.867 | d14 = 0.90 | n8 = 1.88300 | v8 = 40.8 |
| r15 = 16.554 | d15 = 2.76 | n9 = 1.72825 | v9 = 28.5 |
| r16 = −75.795 | d16 = 0.89 | | |
| r17 = 50.389 (aspherical) | d17 = 3.33 | n10 = 1.58313 | v10 = 59.4 |
| r18 = −17.122 | d18 = 3.67 | n11 = 1.85026 | v11 = 32.3 |
| r19 = −31.225 | d19 = variable | | |
| r20 = 55.477 | d20 = 1.96 | n12 = 1.67000 | v12 = 57.3 |
| r21 = −48.568 | d21 = 0.20 | | |
| r22 = 40.354 | d22 = 0.90 | n13 = 1.84666 | v13 = 23.9 |
| r23 = 13.592 | d23 = 3.72 | n14 = 1.71300 | v14 = 53.9 |
| r24 = −145.047 | d24 = variable | | |
| r25 = ∞ | d25 = 21.00 | n15 = 1.70154 | v15 = 41.2 |
| r26 = ∞ | d26 = 3.50 | n16 = 1.51633 | v16 = 64.1 |
| r27 = ∞ | d27 = 2.75 | | |

| | Focal length | | |
|---|---|---|---|
| Variable distance | 4.61 | 20.85 | 52.71 |
| d5 | 0.93 | 26.06 | 34.44 |
| d12 | 35.45 | 10.32 | 1.94 |
| d19 | 10.80 | 7.71 | 9.07 |
| d24 | 2.74 | 5.83 | 4.47 |

| Aspherical Coefficients | | | | | |
|---|---|---|---|---|---|
| K | B | C | D | E | F |
| 17-th surface  8.6391e−01 | −1.3307e−05 | 1.6716e−07 | −2.8725e−09 | 4.4579e−13 | 2.8650e−13 |

NUMERICAL EXAMPLE 2 f = 4.60~52.67 FNo = 1: 1.66~2.88 2ω = 66.2°~6.5°

| | | | |
|---|---|---|---|
| r1 = 104.999 | d1 = 2.70 | n1 = 1.84666 | ν1 = 23.9 |
| r2 = 43.592 | d2 = 10.97 | n2 = 1.62041 | ν2 = 60.3 |
| r3 = −274.906 | d3 = 0.20 | | |
| r4 = 36.263 | d4 = 5.29 | n3 = 1.78800 | ν3 = 47.4 |
| r5 = 85.407 | d5 = variable | | |
| r6 = 82.911 | d6 = 1.10 | n4 = 1.83481 | ν4 = 42.7 |
| r7 = 8.498 | d7 = 5.11 | | |
| r8 = −24.869 | d8 = 1.10 | n5 = 1.83481 | ν5 = 42.7 |
| r9 = 42.635 | d9 = 0.20 | | |
| r10 = 21.026 | d10 = 4.60 | n6 = 1.84666 | ν6 = 23.9 |
| r11 = −18.326 | d11 = 0.90 | n7 = 1.70154 | ν7 = 41.2 |
| r12 = 86.452 | d12 = variable | | |
| r13 = ∞ (aperture stop) | d13 = 6.20 | | |
| r14 = −79.727 | d14 = 0.90 | n8 = 1.88300 | ν8 = 40.8 |
| r15 = 16.620 | d15 = 2.84 | n9 = 1.72151 | ν9 = 29.2 |
| r16 = −61.762 | d16 = 1.03 | | |
| r17 = 49.598 (aspherical) | d17 = 3.42 | n10 = 1.58313 | ν10 = 59.4 |
| r18 = −16.921 | d18 = 3.58 | n11 = 1.80610 | ν11 = 33.3 |
| r19 = −32.479 | d19 = variable | | |
| r20 = 61.490 | d20 = 1.98 | n12 = 1.65160 | ν12 = 58.5 |
| r21 = −46.099 | d21 = 0.20 | | |
| r22 = 38.885 | d22 = 0.90 | n13 = 1.84666 | ν13 = 23.9 |
| r23 = 13.804 | d23 = 3.78 | n14 = 1.71300 | ν14 = 53.9 |
| r24 = −151.067 | d24 = variable | | |
| r25 = ∞ | d25 = 21.00 | n15 = 1.70154 | ν15 = 41.2 |
| r26 = ∞ | d26 = 3.50 | n16 = 1.51633 | ν16 = 64.1 |
| r27 = ∞ | d27 = 2.75 | | |

| | Focal length | | |
|---|---|---|---|
| Variable distance | 4.60 | 20.81 | 52.67 |
| d5 | 0.96 | 26.09 | 34.47 |
| d12 | 35.75 | 10.62 | 2.24 |
| d19 | 11.28 | 8.01 | 9.16 |
| d24 | 2.73 | 6.00 | 4.86 |

Aspherical Coefficients

| | K | B | C | D | E | F |
|---|---|---|---|---|---|---|
| 17-th surface | 9.0655e−01 | −1.1663e−05 | 1.3681e−07 | −2.0639e−09 | −7.8146e−13 | 2.0475e−13 |

TABLE 1

| Conditional Expression | Numerical Example 1 | Numerical Example 2 |
|---|---|---|
| (1) | 0.30 | 0.30 |
| (2) | 0.13 | 0.13 |
| (3) | 0.04 | 0.06 |
| (4) | −0.18 | −0.21 |

Next, an embodiment of a video camera (image pickup apparatus), to which the zoom lens system according to the embodiment of the invention is applied as the photographing optical system, is described below with reference to FIG. 5.

In FIG. 5, reference numeral 10 denotes a video camera body, and reference numeral 11 denotes a photographing optical system constituted by the zoom lens according to the embodiment of the invention. Reference numeral 12 denotes a solid-state image pickup element such as a CCD. The solid-state image pickup element 12 receives an object image formed with the photographing optical system 11. Reference numeral 13 denotes a memory that stores the object image received by the solid-state image pickup element 12. Reference numeral 14 denotes a viewfinder for observation of the object image displayed on a display element (not shown). The display element includes a liquid crystal panel or the like, whereby the object image formed on the solid-state image pickup element 12 is displayed.

By applying the zoom lens system according to the embodiment of the invention to the image pickup apparatus such as a video camera, the image pickup apparatus having the zoom lens capable of providing a high optical performance in the whole zooming region can be provided.

The application of the zoom lens system of the invention is not limited to the video camera. The zoom lens system may be applied to a digital still camera.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-115085 filed Apr. 25, 2007, which is hereby incorporated by reference herein in its entirety.

What is claimed is:

1. A zoom lens system, in that order from an object side to an image side, comprising:
a first lens unit having a positive optical power;
a second lens unit having a negative optical power;

a third lens unit having a positive optical power, the third lens unit including a first lens subunit having a negative optical power, and a second lens subunit having a positive optical power, in that order from the object side to the image side; and a fourth lens unit having a positive optical power, the fourth lens unit including at least a positive lens element, wherein the second and fourth lens units move along an optical axis during zooming, wherein the first lens subunit has no more than a positive lens element and a negative lens element, wherein the second lens subunit has no more than a positive lens element and a negative lens element, and wherein the following conditional expressions are satisfied:

$$0.21 < 3aNn - 3bPn$$

$$0.07 < 4Pn - 3bPn$$

where 3aNn is a refractive index of a material of the negative lens element in the first lens subunit, 3bPn is a refractive index of a material of the positive lens element in the second lens subunit, and 4Pn is a refractive index of a material having the highest refractive index in a material of the positive lens element included in the fourth lens unit.

2. The zoom lens system according to claim 1, wherein the second lens subunit moves in a direction with a component perpendicular to the optical axis so as to shift an image formed with the zoom lens system in a direction perpendicular to the optical axis.

3. The zoom lens system according to claim 1, wherein the first lens unit has no more than a negative lens element, a positive lens element, and a positive lens element, in that order from the object side to the image side.

4. The zoom lens system according to claim 3, wherein the following conditional expression is satisfied:

$$0.01 < G1n - G3n < 0.11$$

where G1n is a refractive index of a material of the negative lens element in the first lens unit, and G3n is a refractive index of a material of the positive lens element near the image side in the first lens unit.

5. The zoom lens system according to claim 1, wherein the negative lens element of the first lens subunit and the positive lens element of the first lens subunit are positioned in that order from the object side to the image side.

6. The zoom lens system according to claim 5, wherein the following conditional expression is satisfied:

$$-1.0 < 3aR2/3aR1 < 0.1$$

where 3aR1 is a radius of curvature of a lens surface near the object side of the negative lens element in the first lens subunit, and 3aR2 is a radius of curvature of a lens surface near the image side of the negative lens element in the first lens subunit.

7. The zoom lens system according to claim 5, wherein the negative lens element in the first lens subunit has a larger absolute value of an optical power at a lens surface near the image side than an absolute value of an optical power at a lens surface near the object side, the lens surface near the image side being concave, and wherein the positive lens element in the first lens subunit has a larger absolute value of an optical power at a lens surface near the object side than an absolute value of an optical power at a lens surface near the image side.

8. A camera comprising:
the zoom lens system according to claim 1; and
a solid-state image pickup element configured to receive an image formed with the zoom lens system.

9. A zoom lens system, in that order from an object side to an image side, comprising:

a first lens unit having a positive optical power, the first lens unit having no more than a negative lens element, a positive lens element, and a positive lens element, in that order from the object side to the image side;

a second lens unit having a negative optical power;

a third lens unit having a positive optical power, the third lens unit including a first lens subunit having a negative optical power, and a second lens subunit having a positive optical power, in that order from the object side to the image side; and a fourth lens unit having a positive optical power, wherein the second and fourth lens units move along an optical axis during zooming, wherein the first lens subunit has no more than a positive lens element and a negative lens element, wherein the second lens subunit has no more than a positive lens element and a negative lens element, and wherein the following conditional expressions are satisfied:

$$0.21 < 3aNn - 3bPn$$

$$0.01 < G1n - G3n < 0.11$$

where 3aNn is a refractive index of a material of the negative lens element in the first lens subunit, 3bPn is a refractive index of a material of the positive lens element in the second lens subunit, G1n is a refractive index of a material of the negative lens element in the first lens unit, and G3n is a refractive index of a material of the positive lens element near the image side in the first lens unit.

10. A camera comprising:
the zoom lens system according to claim 9; and
a solid-state image pickup element configured to receive an image formed with the zoom lens system.

11. A zoom lens system, in that order from an object side to an image side, comprising:

a first lens unit having a positive optical power, the first lens unit having no more than a negative lens element, a positive lens element, and a positive lens element, in that order from the object side to the image side;

a second lens unit having a negative optical power;

a third lens unit having a positive optical power, the third lens unit including a first lens subunit having a negative optical power and a second lens subunit having a positive optical power, in that order from the object side to the image side; and a fourth lens unit having a positive optical power, wherein the second and fourth lens units move along an optical axis during zooming, wherein the first lens subunit has no more than a negative lens element and a positive lens element, in that order from the object side to the image side, wherein the second lens subunit has no more than a positive lens element and a negative lens element, and wherein the following conditional expressions are satisfied:

$$0.21 < 3aNn - 3bPn$$

$$-1.0 < 3aR2/3aR1 < 0.1$$

where 3aNn is a refractive index of a material of the negative lens element in the first lens subunit, 3bPn is a refractive index of a material of the positive lens element in the second lens subunit, 3aR1 is a radius of curvature of a lens surface near the object side of the negative lens element in the first lens subunit, and 3aR2 is a radius of curvature of a lens surface near the image side of the negative lens element in the first lens subunit.

12. A camera comprising:
the zoom lens system according to claim 11; and
a solid-state image pickup element configured to receive an image formed with the zoom lens system.

* * * * *